United States Patent [19]

Drake

[11] 4,377,763
[45] Mar. 22, 1983

[54] SEAL SECTION FOR A DOWNHOLE PUMPING UNIT

[75] Inventor: Eldon L. Drake, Shawnee, Okla.

[73] Assignee: Western Technology, Inc., Shawnee, Okla.

[21] Appl. No.: 245,615

[22] Filed: Mar. 19, 1981

[51] Int. Cl.³ .............................................. H02K 5/12
[52] U.S. Cl. .................................... 310/87; 310/112; 417/424
[58] Field of Search .......................... 310/86, 87, 112; 417/424

[56] References Cited

U.S. PATENT DOCUMENTS

| 2,951,165 | 8/1960 | Arutunoff | 310/87 X |
| 3,153,160 | 10/1964 | Carle | 310/87 |
| 3,182,214 | 5/1965 | Boyd | 310/87 |
| 3,502,919 | 3/1970 | Boyd et al. | 310/87 |
| 3,539,849 | 11/1970 | Kampfen | 310/87 X |
| 3,571,636 | 3/1971 | Carle et al. | 310/87 X |
| 3,770,635 | 11/1973 | Atendido et al. | 310/87 X |
| 4,040,973 | 8/1977 | Tuzson | 310/87 X |

Primary Examiner—Donovan F. Duggan
Attorney, Agent, or Firm—Laney, Dougherty, Hessin & Beavers

[57] ABSTRACT

A seal section for connecting a downhole motor and pump used to remove fluids from an oil well comprising a plurality of balance chambers which are vertically stacked and fluidly interconnected in a serial manner such that a fluid path between the well and the motor extends through a series of balance chambers. Each balance chamber is comprised of two concentric, open ended tubes disposed within a tubular casing member and the tubes of each balance chamber are mounted on different ones of seal heads which are spaced vertically along the seal section to delimit the ends of the balance chambers. Each seal head intermediate the seal heads disposed at upper and lower ends of the seal section is provided with one upperwardly extending tube and one downwardly extending tube such that any selected number of balance chambers can be formed by selecting the number of intermediate seal heads to be incorporated into the seal section.

5 Claims, 8 Drawing Figures

SEAL SECTION FOR A DOWNHOLE PUMPING UNIT

BACKGROUND OF THE INVENTION

1. Field of the Invention

The present invention relates generally to balance chamber type sealing apparatus and, more particularly, but not by way of limitation, to sealing apparatus suitable for use between a downhole motor and pump.

2. Brief Description of the Prior Art

In the recovery of oil from a well, it is often necessary that fluids in the well be pumped to the surface and various types of pumping units have been developed for this purpose. A particular type of unit which is advantageous in some circumstances comprises an electric motor and a pump which can be operated by rotating an input shaft thereof. In these units, it is common practice to connect the output shaft of the motor to the input shaft of the pump and lower the entire assembly into the well.

While pumping units of this type offer certain advantages known to those skilled in the art, they also present technical problems. A basic problem is to isolate the interior of the motor from well fluids while, at the same time, providing for repeated expansion and contraction of oil with which the motor is filled, such expansion and contraction arising thermally from intermittent operation of the motor.

A solution to this problem is to incorporate a balance chamber into a seal section disposed between the motor and the pump. The upper end of the chamber is placed in fluid communication with the interior of the motor while the lower end thereof is placed in fluid communication with the exterior of the seal section; that is, at such times that the pumping unit is in the well, with fluids to be pumped from the well. The chamber is filled with the same oil as that which fills the motor or, in some cases, with a combination of fluids prior to lowering the pumping unit into a well. When the motor is initially operated, the oil in the motor expands with the result that a portion of the fluid in the balance chamber is discharged into the well. Upon subsequent cooling and contraction of the oil in the motor, when the motor is shut off, well fluids enter the balance chamber at the lower end thereof. However, such fluids are prevented from entering the motor by selecting the fluids with which the motor and chamber are filled to be immiscible with the well fluids and to be less dense than the well fluids. With these selections, well fluids that enter the balance chamber will underlie the fluids that are introduced thereinto and into the motor so that, if the balance chamber has sufficient volume, the well fluids will not reach the upper end of the balance chamber when the motor is turned off, causing oil therein to contract, so that no well fluid will reach the motor. Moreover, after the initial operation of the motor, subsequent operations will cause well fluids which have entered the balance chamber to be discharged therefrom prior to further discharge of fluids which were initially introduced into the motor and chamber because of the discharge of fluid from the lower end of the balance chamber. As a result, subsequent operations of the motor merely move the interface between the well fluids and the fluids introduced into the motor and balance chamber between two levels in the balance chamber. Examples of seal sections designed to be used to connect an electric motor to a pump in a downhole pumping unit and incorporating a balance chamber to provide a seal as described above are disclosed in U.S. Pat. No. 2,783,400 issued Feb. 26, 1957 to Arutunoff; in U.S. Pat. No. 3,150,160 issued Oct. 13, 1964 to Carle; and in U.S. Pat. No. 3,502,919 issued Mar. 24, 1970 to Boyd, et al.

While the concept of the balance chamber is straight forward, practical problems are encountered in their use. In particular, one problem which has heretofore remained unsolved is associated with a dependence on the requisite volume of the balance chamber on the circumstances in which a particular downhole pump will be used. As a practical matter, considerable variety exists in these circumstances and, consequently, a corresponding variety exists in the sizes of the motors that are incorporated into downhole pumping units. Since different size motors will, through thermal expansion of oil contained therein, discharge different volumes of oil upon initial startup, the requisite volume of the balance chamber for the above described operation will depend upon the size of the motor with which it is used. While it is possible to make a balance chamber large enough to accommodate a variety of motor sizes, it is uneconomical to do so and, moreover, the construction of large balance chambers can give rise to another difficulty. An increase in the size of the balance chamber generally must be effected through an increase in its length with the result that the connection between the motor and the pump can present a problem. Such connection is made via a shaft which extends through the balance chamber and increasing the length of the shaft introduces a tendency of the shaft to undergo a whipping motion as it rotates to drive the pump. This motion can decrease the lifetime of seals mounted on the shaft to seal the upper end of the balance chamber against the entry of well fluid thereinto along the shaft. While this problem can be eliminated by supporting the shaft in its passage through the balance chamber, such support often makes it difficult to assemble the seal section which contains the balance chamber.

SUMMARY OF THE INVENTION

The present invention solves these problems by providing a seal section with a readily variable effective balance chamber volume. For this purpose, the seal section of the present invention comprises a plurality of ganged modules which are serially connected so that well fluid must pass through a plurality of balance chambers, formed by the modules, to reach the motor in the pumping unit. Moreover, each module is made relatively short to eliminate any apprecible whipping effect on the shaft connecting the pump and motor so that the modules can be easily ganged by connecting them together via segments of casing that interconnect the modules. Thus, the present invention is particularly characterized in that the shaft is supported in its passage to the seal section solely by bearings which are disposed in seal heads forming portions of the modules and remaining portions of the modules, which form the plurality of balance chambers which coact to form an effective balance chamber of substantial length, are constructed to eliminate interference between such remaining portions and the shaft which would cause the seal section to be difficult to assemble. Specifically, each module comprises, in addition to the seal head, an upperwardly extending balance chamber inner wall member and a downwardly extending balance chamber outer wall member, such wall members both terminating in a free end disposed in a non-engaging relation with remaining portions of the seal section so that the wall members, like the shaft, are supported solely by the seal heads to thereby eliminate connections between the wall members and the shaft and multiple connections between a wall member and more than one seal head which would give rise to assembly problems for the seal section.

An object of the present invention is to provide a balance chamber type seal section which can be used with a wide range of motors that can be included in a downhole pumping unit.

Another object of the invention is to provide a seal section of the type disclosed with a readily variable effective balance chamber volume.

Still a further object of the invention is to provide a balance chamber type seal section which has a relatively large effective balance chamber volume and is easily assemblied.

Other objects, advantages and features of the present invention will become clear from the following detailed description of the preferred embodiment of the invention when read in conjunction with the drawings and appended claims.

DESCRIPTION OF THE PREFERRED EMBODIMENT

Figure 1:
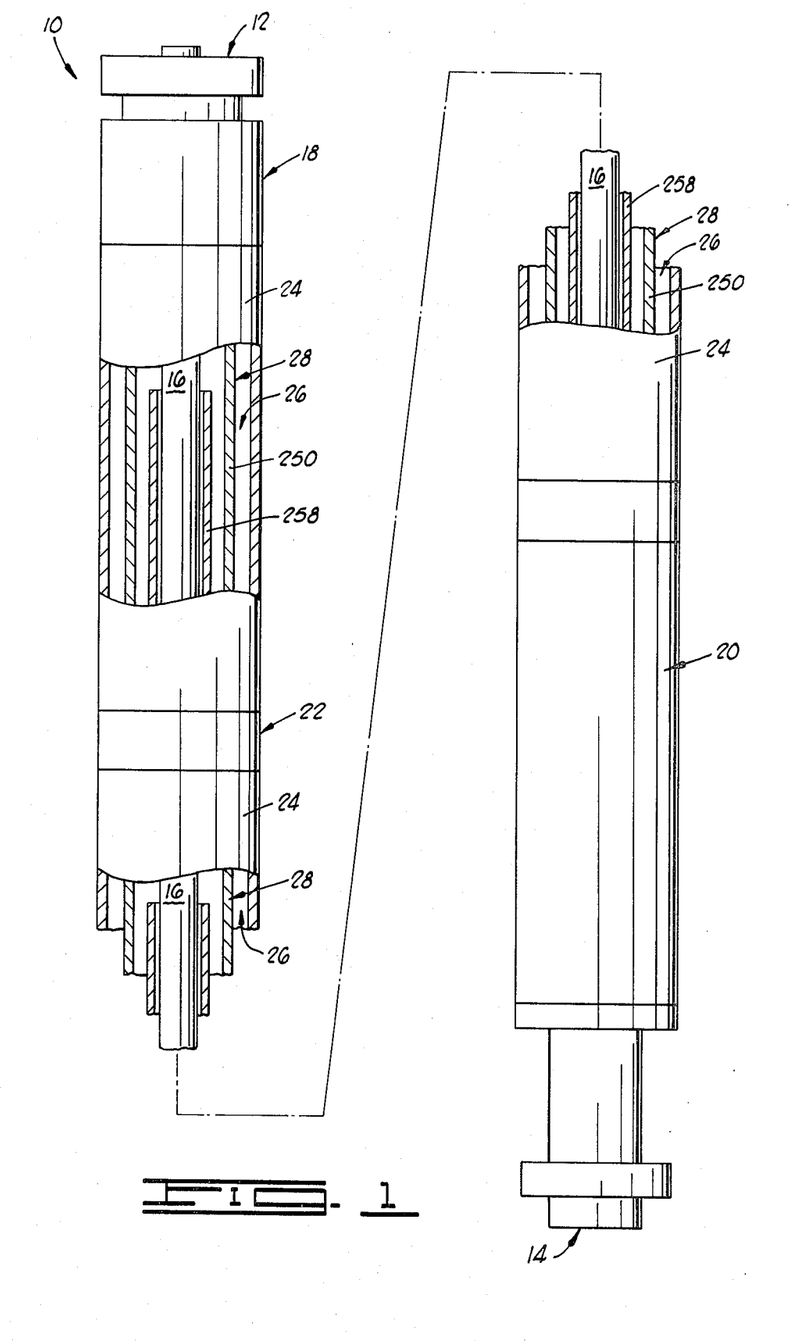
FIG. 1 is a side elevation in partial cutaway of a seal section constructed in accordance with the present invention.

Referring now to the drawings in general and to FIG. 1 in particular, shown therein and designated by the general reference numeral 10 is a seal section constructed in accordance with the present invention. In general, the seal section 10 has an upper end 12 which is adapted to be connected to a downhole pump (not shown) and a lower end 14 which is similarly adapted to be connected to a downhole electric motor (not shown). Passing axially through the greater length of the seal section 10 and extending a short distance above the upper end 12 thereof is a shaft 16 which connects the motor to the pump such that the pump can be operated by the motor via turning the shaft 16 by the motor. (As shown in FIG. 5B, the lower end of the shaft 16 terminates within the seal section 10 a short distance above the lower end 14 thereof.)

The seal section 10 generally comprises a plurality of seal heads which are spaced vertically along the axis of the seal section 10 and three such seal heads have been shown in FIG. 1. Specifically, the seal section 10 comprises: an upper seal head 18 at the upper end 12 of the seal section 10; a lower seal head 20 at the lower end 14 of the seal section 10; and at least one intermediate, or module, seal head 22 disposed between the upper and lower seal sections 18 and 20 respectively. In the assembled seal section 10, the seal heads are connected, one to another, by means of a plurality of tubular casing members 24 which are preferably identical and which, as will be discussed below, are adapted to mate with one seal head at the upper end of the casing member and to mate with one seal head at the lower end of the casing member via threads formed internally in the casing members and mating threads formed on the seal heads. Thus, as is indicated in FIG. 1, the casing members 24, the seal heads, and the shaft 16 coact to form a plurality of annular compartments 26 which are vertically stacked along the axis of the seal section 10, each such compartment being delimited at upper and lower ends thereof by one of the seal heads and each such compartment being radially delimited by the shaft 16 and the inside periphery of the casing member 24 forming such compartment.

The seal section 10 further comprises a plurality of balance chamber forming assemblies 28, one such assembly disposed in each compartment 26 as has been further indicated in FIG. 1. In accordance with the present invention, each balance chamber forming assembly 28 includes a portion connected solely to the uppermost of the two seal heads delimiting the compartment wherein the assembly 28 is disposed and a portion connected solely to the lowermost of such two seal heads so that, as will be discussed below, the seal section 10 can be readily provided with substantially any number of serially interconnected balance chamber members disposed along the length thereof.

Figure 2:
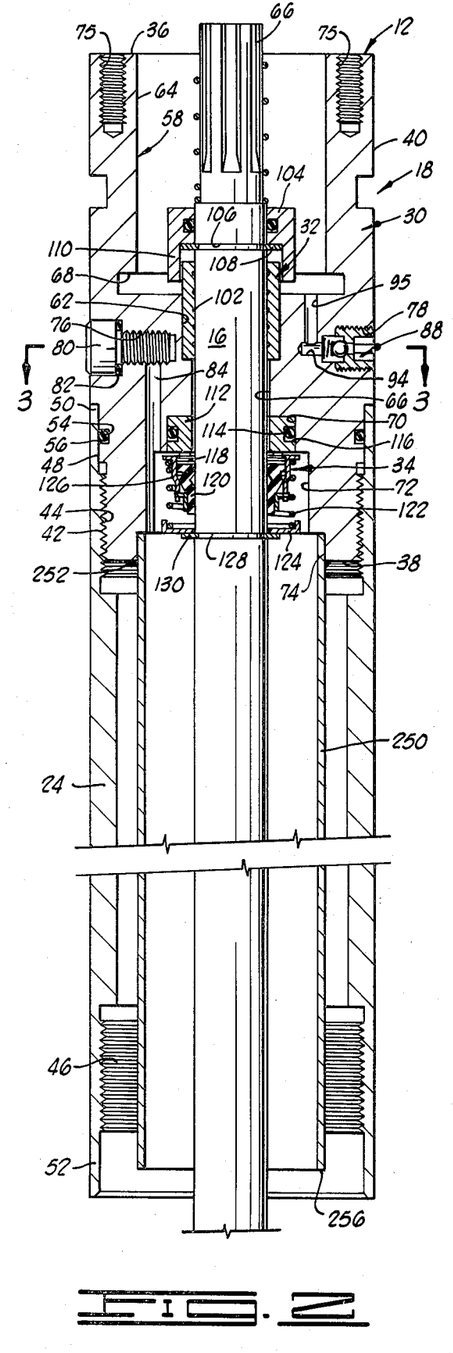
FIG. 2 is a cross-section in side elevation of the upper seal head of the seal section.
Figure 3:
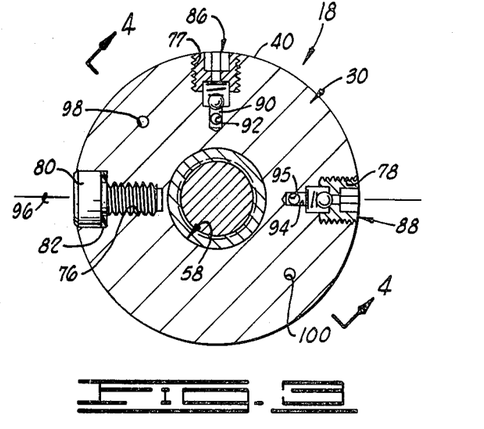
FIG. 3 is a transverse cross-section of the upper seal head taken along line 3—3 of FIG. 2.
Figure 4:
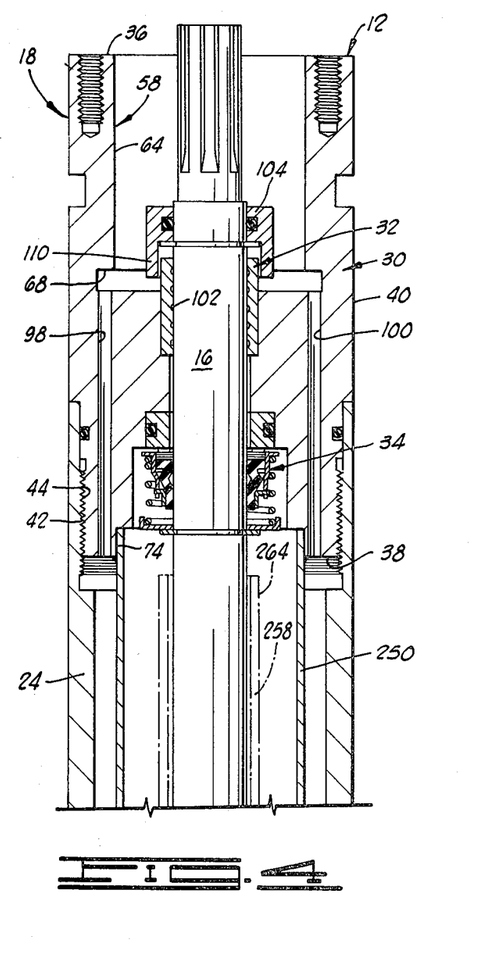
FIG. 4 is a cross-section in side elevation of the upper seal head similar to FIG. 2 but taken along a different axial plane as indicated by the line 4—4 in FIG. 3.

The construction of the upper seal head 18 has been specifically illustrated in FIGS. 2 through 4 to which attention is now invited. As shown especially in FIGS. 2 and 4, the upper seal head 18 comprises three basic portions: a seal head block 30; a bearing 32 and a seal assembly 34. These will be discussed in turn. The upper seal head block 30 is generally cylindrical in form, having parallel upper and lower ends, 36 and 38 respectively, and a circular outer peripheral surface 40 extending therebetween. Portions of the peripheral surface 40 of the upper seal head block 30 adjacent the lower end 38 thereof are formed on a reduced diameter and partially threaded, as at 42, so that the upper seal head block 30 can be screwed to one of the casing members 24, each end of each casing member 24 being provided with internal threads, as at 44 and 46, for this purpose. It is convenient to leave a portion 48 of the reduced portion 40 of the upper seal head block 30 unthreaded, such unthreaded portion being above and on a slightly larger diameter than the threaded portion thereof, and to provide the casing member 24 with mating, cylindrical projections 50, 52 in order to provide a seal between the upper seal head block 30 and the casing member 24. Specifically, such seal is effected by an O-ring 54 disposed in an annular groove 56 formed in the unthreaded portion 48 of the reduced portion of the periphery 40 of the upper seal head head block 30.

A bore, generally indicated at 58, is formed through the upper seal head block 30 to form a bore through the upper seal head 18 such that the shaft 16 can pass therethrough. Near the center of the upper seal head block 30, the bore 58 has a relatively small diameter portion 60 which is slightly larger than the diameter of the shaft 16 such that the shaft 16 can pass freely therethrough.

Above the portion 60, the bore 58 has an intermediate diameter portion 62 which is sized to receive the bearing 32 and the bore 58 is thereabove dilated to form a relatively large diameter portion 64 which provides ready access to the bearing 32 and the upper end 66 of shaft 16. An annular groove 68 is formed in the bore 58, between the portions 62 and 64 thereof, for a purpose that will become clear below. Between the small diameter portion 60 of bore 58 and the lower end 38 of the upper seal head block 30, the bore 58 has three successively larger portions 70, 72 and 74. At the upper end 12 of the upper seal head 18, outside the bore 58, a plurality of threaded holes 75 are formed in the upper end 36 of the upper seal head block 30 to provide a means for connecting the pump to the seal section 10.

Near the center of the upper seal head block 30, three ports 76, 77 and 78 (see also FIG. 3) are formed therein to intersect the outer periphery 40 thereof and the ports extend radially inwardly from the periphery 40. Portions of the port 76 adjacent the periphery 40 are formed on an enlarged diameter and the smaller diameter portions of the port 76 are threaded such that the port 76 will receive a capscrew 80 and a lead washer 82, as shown in FIGS. 2 and 3, and a passage 84 is formed between the port 76 and the portion 72 of the bore 58 to facilitate filling the seal section 10 with oil as will be discussed below. Portions of the ports 77 and 78 near the periphery 40 of the upper seal head block 30 are similarly formed on a large diameter to receive, respectively, a check valve 86, which will permit fluids to be discharged from the seal section 10 into the well, and a check valve 88, which permits fluids to enter the seal section 10 from the well. The check valves 86 and 88 communicate the well with the enlarged portion 64 of the bore 58 adjacent the upper end 36 of the upper seal head block 30 via passages 90 and 92, for the check valve 86, and 94 and 95, for the check valve 88, which lead to the portion 64 of the bore 58 as has been shown for the passages 94 and 95 in FIG. 2.

As shown in FIG. 3, the ports 76 and 78 can conveniently be formed along a common diameter, designated 96 in FIG. 3, of the upper seal head block 30 and two passages, 98 and 100, are formed longitudinally through portions of the upper seal head block 30 which are angularly displaced from the diameter 96. As shown in FIG. 4, the passages 98 and 100 intersect the groove 68 formed in the bore 58 of the upper seal head block 30 and the lower end 38 of the upper seal head block 30 outside the portion 74 of the bore 58. The formation of the groove 68 thus facilitates the formation of the passages 98 and 100 such that the passages 98 and 100 will intersect portions of the lower end 38 of the upper seal head block 30 outside the enlarged portion 78 of the bore 58 and the purpose of so positioning the intersection between the passages 98, 100 and the lower end 38 of the upper seal head block 30 will be discussed below.

The bearing 32 is a conventional bronze sleeve bearing which is pressed into the portion 62 of the bore 58 and is provided with internal helical grooves, indicated at 102, to permit fluids to enter the bearing 32 and act as a lubricant between the bearing 32 and the shaft 16 which is journaled therein. As shown in FIGS. 2 and 4, a portion of the bearing 32 projects upwardly from the portion 62 of the bore 58 and coacts with an annular cap 104, mounted on the shaft 16 to prevent sediment from the well from entering portions of the bore 58 below the bearing 32. For this purpose, the cap 104 is positioned on the shaft 16 via a conventional groove 106, formed in the shaft 16 of the bearing 32, and split ring 108 and the cap 104 has a downwardly extending circular flange 110 which extends about an upper portion of the bearing 32.

The seal assembly 34 comprises a seal ring 112 which is disposed within the portion 70 of the bore 58 and which has an O-ring 114 disposed in a groove 116 formed in the outer periphery thereof to provide a seal between the ring 112 and the bore 58 of the upper seal head 18. A graphite ring 118, which is sealed to the shaft 16 via an elastomeric collar 120, engages the lower side of the seal ring 112 to form a seal between the seal ring 112 and the shaft 16 such that the seal assembly 34 forms a seal between the shaft 16 and the bore 58 of the upper seal head 18. A spring 122, the lower end of which is supported by a ring 124 and the upper end of which engages a flanged tubular member 126, which is attached to the graphite ring 118 via the collar 120, forces the graphite ring into firm contact with the seal ring 112. The ring 124 is positioned on the shaft 16 via a conventional annular groove 128, formed in the shaft 16, and a split ring 130 in the same manner that the cap 104 is mounted on shaft 16 via groove 106 and split ring 108.

Figure 5A:
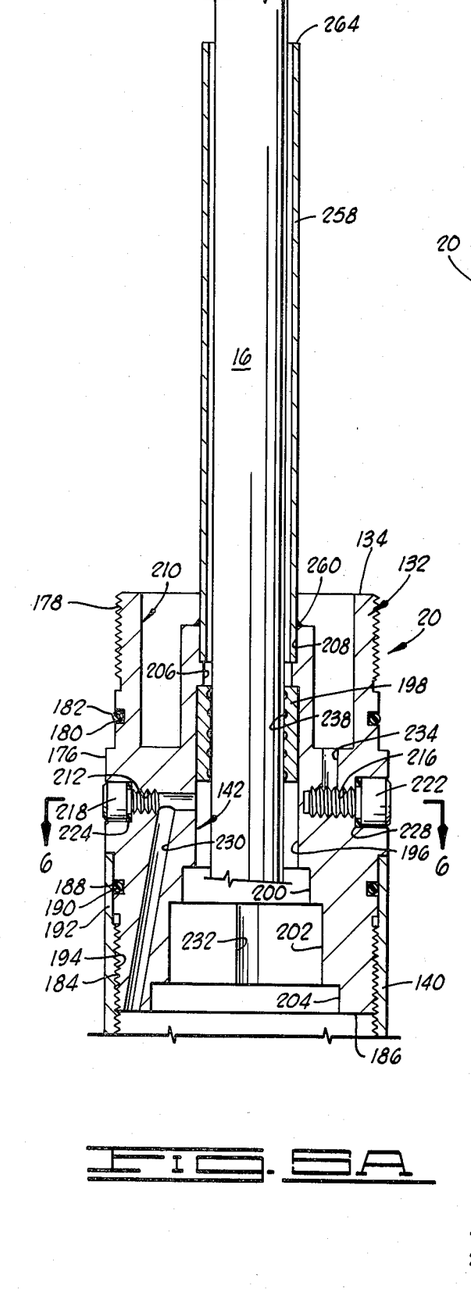
FIGS. 5A and 5B are portions of a cross-section in side elevation of the lower seal head of the seal section.
Figure 5B:
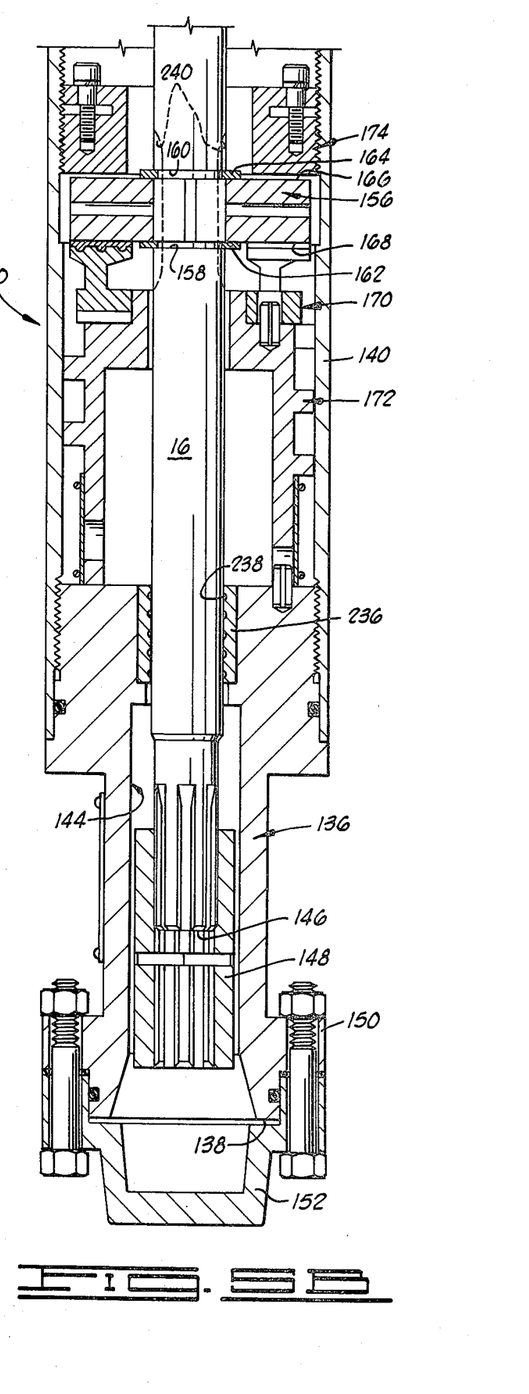
Figure 6:
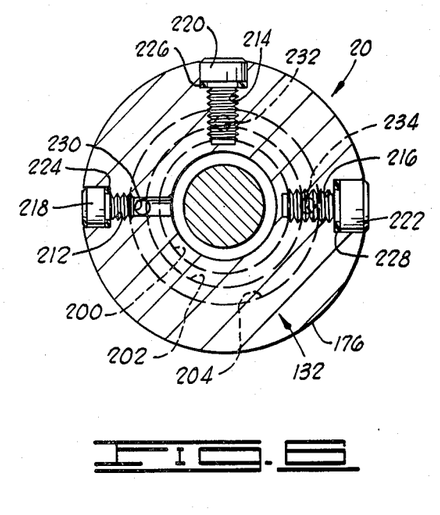
FIG. 6 is a transverse cross-section of the lower seal head taken along line 6—6 of FIG. 5A.

The lower seal head 20, which is more particularly shown in FIGS. 5A, 5B and 6, is a composite structure including: a lower seal head block 132 disposed generally adjacent an upper end 134 of the lower seal head 20, the upper end 134 of the lower seal head 20 forming an upper end of the lower seal head block 132; a motor mount 136 disposed generally adjacent the lower end 138 of the lower seal head 20, the lower end 138 of the lower seal head 20 forming a lower end for the motor mount 136; and a length of tubing 140 which connects to the lower seal head block 132 and the motor mount 136 and extends therebetween to form the lower seal head 20 into a unit of the seal section 10. A bore 142 (FIG. 5A) is formed axially through the lower seal head block 132 and a bore 144 (FIG. 5B) is formed through the motor mount 136, the bores 142 and 144 cooperating with the open center of the tubing 140 to form a bore through the lower seal head so as to permit passage of the shaft 16 therethrough. (As shown in FIG. 5B, the shaft 16 can be terminated in a free end 146 disposed within the bore 144 of the motor mount 136 to facilitate connection of the shaft 16 to the motor where the motor has a protruding shaft. Similarly, the bore 144 can be made large enough to accommodate a coupling 148 which rotationally mates the shaft 16 to the shaft of the motor. The motor mount 136 can further be provided with an apertured flange 150 for bolting the seal section 10 to the motor and it is convenient to provide a cap, such as the cap designated 152 in FIG. 5B, to close the lower end 138 of the seal section 10 during shipping. (A similar shipping cap, not shown, can be provided for the upper end of the seal section 10.)

In the preferred embodiment of the invention, the shaft 16 is axially positioned in the seal section 10 by means of a conventional support disk 156 which is positioned on the shaft 16 via grooves 158, 160 therein and split rings 162, 164 which are partially disposed in the grooves and engage upper and lower sides, 166 and 168 respectively, of the disk 156. The lower side 168 of the disk 156 is positioned by a conventional shoe assembly 170 mounted atop a conventional heat exchanger 172 which rests on the motor mount 136 and the upper side 166 of the disk 156 is positioned by a conventional clamp ring 174 which screws into the tubing 140. The shoe assembly 170, heat exchanger 172 and clamp ring 174 have been discussed in detail in the aforementioned U.S. Pat. No. 3,502,919 so that it need not be further described herein.

In the preferred practice of the present invention, the lower seal head block 132 conforms to a standardized construction which is also used in the intermediate seal head 22 and will now be described with particular reference to FIGS. 5A and 6. Like the upper seal head block 30, the lower seal head block 132 has a generally cylindrical periphery 176 and the periphery 176 has reduced diameter, threaded portions such that internally threaded tubes can be screwed on to the lower seal head block 132 in the same manner that one of the casing members 24 can be screwed on to the upper seal head block 30. In particular, one such reduced portion, designated 178 in FIG. 5A, is formed adjacent the upper end 134 of the lower seal head block 132 and upper portions of the reduced portion 178 are threaded to mate with the threads 46 (see FIG. 2) in the lower ends of the casing members 24 so that the lower seal head block 132 can be connected to remaining portions of the seal section 10 by screwing the lower seal head block 132 into the bottom of one of the casing members 24. Similarly, lower portions of the portion 178 of the periphery 176 of the lower seal head block 132 are smooth and are provided with an annular groove 180 which contains an O-ring 182 to form a seal with the projection 52 at the lower end of a casing member 24. A second reduced diameter threaded portion 184 is formed in the periphery 176 adjacent the lower end 186 of the lower seal head block 132 and, in particular, such reduced diameter portion 184 is shaped to mate with the upper end of the casings members 24 so that intermediate seal heads, which include seal head blocks identical to the lower seal head block 132, can be screwed into the upper end of one of the casing members 24. As is the case with the reduced diameter portion 178, portions of the reduced diameter portion 184 which are farthest from the end of the lower seal head block 132 wherein the reduced diameter portion 184 is formed are left unthreaded and are provided with an annular groove 188 which accepts an O-ring 190 for sealing with a projection 50 on a casing member 24, in the case of the seal head blocks forming a portion of an intermediate seal head, or with a projection 192 formed on the upper end of the tubing 140. The tubing 140 is also provided with internal threads 194 which will mate with the threads on the reduced diameter portion 184 of the periphery 176 of the lower seal head block 132.

Like the bore 58 through the upper seal head block 30, the bore 142 through the lower seal head block 132 is formed in a plurality of different diameter portions and such form is partially to facilitate the positioning of a bearing in the bore 142. Specifically, a medial portion 196 of the bore 142 is formed on a diameter to accept a bearing 198 which is preferably identical to the bearing 132 of the upper seal head 18. Below the portion 196 thereof, the bore 142 has three portions 200, 202, and 204 which have increasing diameters toward the lower end 186 of the lower seal head block 132. (As will be discussed below, these portions of the bore 142 are related to the construction of the intermediate seal heads which, as noted above, include a seal head block identical to the lower seal head block 132. Thus, the enlargement of the bore 142 below the portion 196 thereof can be deleted for the lower seal head block 132. Preferably, the lower seal head block 132 and the seal head blocks of the intermediate seal heads have a standardized construction.) Above the portion 196 thereof, the bore 142 has a reduced diameter portion 206 which forms a shoulder in the bore 142 to abut and position the bearing 198 therein. A portion 208 of the bore 142, the portion 208 having a diameter which is slightly enlarged with respect to the diameter of the portion 206, overlays the portion 206. For a purpose to be discussed below, it is useful to form an annular groove 210 in the upper end 134 of the lower seal head block 132, said groove 210 being concentric with the bore 142 and extending about portions thereof near the upper end 134 of the lower seal head block 132.

As is particularly shown in FIG. 6, three ports 212, 214 and 216 are formed in the outer periphery 176 of the lower seal head block 132, the ports 212-216 extending radially inwardly toward the bore 132 and one port, that designated 216 in the drawings, extending to and intersecting the bore 142 below the bearing 198 therein and above the portion 200 of the bore 142. Each of these ports has an enlarged portion adjacent the periphery 176 of the lower seal head block 132 and an internal threaded portion so that the ports 212-216 can be closed via cap screws, 218, 220 and 222 respectively screwed into the ports, and lead washers 224, 226 and 228 respectively mounted on such screws. As in the case of the ports in the upper seal head block 30, the ports 212-216 provide fluid access to various portions of the assembled seal section 10. Specifically, the port 212 is intersected by a passage 230 which angles downwardly to intersect the lower end 186 of the lower seal head block 132 outwardly of the portion 204 of the bore 142. The port 214 is similarly intersected by a passage 232 (see also FIG. 5A) which extends downwardly therefrom to intersect the portion 202 of the bore 142 in the same manner that the passage 84 in the upper seal head block 30 intersects the portion 22 of bore 58 as shown in FIG. 2. (To indicate the positioning of the passage 232, the portions 200, 202 and 204 of the bore 142 through the lower seal head block 132 have been indicated in dashed lines in FIG. 6.) The port 216 is intersected by a passage 234 which extends therefrom to intersect the bottom of the groove 210 formed in the upper end 134 of the lower seal head block 132. Like the port 76 in the upper seal head block 30, the ports 214 and 216 facilitate filling the seal section 10 with oil and the cap screws 220 and 222 serve to close portions of the seal section 10 during the oil charging operation. The port 212 and the passage 230 opening thereinto serve a different purpose, associated with the use of a seal head block identical to the lower seal head block 132 in intermediate seal heads 22, and, because of such purpose, the cap screw 218 is selected to be of a length which will not interrupt the communication between the port 212 and the passage 230.

Referring once again to FIG. 5B, it is desirable that another bearing 236 which, like the bearing 198 in the lower seal head block 132, is identical to the bearing 32 in the upper seal head block 30 be mounted in the motor mount 136 to rotationally support portions of the shaft 16 near the lower end 146 thereof. Like the bearing 32, helical grooves 238 are formed in the inner periphery of each of the bearings 198 and 236 and such grooves serve a lubrication purpose in the same manner that such purpose is served by the grooves 102 in the inner periphery of the bearing 32. However, the grooves 238 in the bearings 198 and 236 serve a further purpose in that they provide fluid communication between the interior of the motor, which is open to the bore 144 in the motor mount 136, and upper portions 206 and 208 of the bore 142 through the lower seal head block 132. The purpose of this fluid communication, which is further effected by slots 240 formed in portions of the shaft 16 whereon the disk 156 is mounted, will become clear below.

Figure 7:
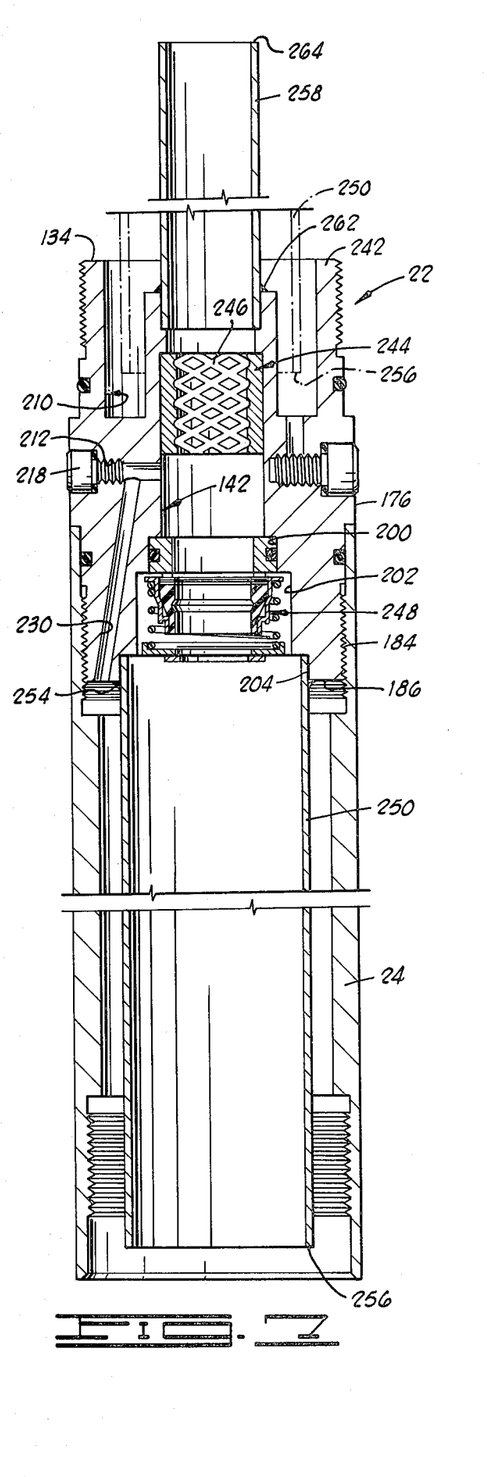
FIG. 7 is a cross-section in side elevation of a seal section module disposed between the upper and lower seal sections.

Referring now to FIG. 7, shown therein is one of the intermediate, or module, seal heads 22 and portions of two different balance chamber forming assemblies 28 which combine with the intermediate seal heads 22 to form a balance chamber module as will be discussed below. The intermediate seal head 22 comprises an intermediate, or module, seal head block 242 which is identical to the lower seal head block 132. Thus, it will not be necessary to describe the intermediate seal head block 242 in detail; rather, it will suffice for purposes of the present disclosure to note such identity and to designate features of the intermediate seal head block 242 with numerals used to designate like features of the lower seal head block 132. The intermediate seal head 22 further comprises a bearing 244 which is identical to the bearings 32 and 198 and which is positioned in the bore 142 of the intermediate seal head block 242 in the same location that the bearing 198 is positioned in the bore 142 of the lower seal head block 132. The bearing 244 is provided with internal helical grooves 246 in the same manner that the bearings 32, 198 and 236 are provided with such grooves.

The intermediate seal head 22 differs from the lower seal 20 in two significant respects: (1) the intermediate seal head 22 does not include structures comparable to the motor mount 136, the tubing 140 or components of the lower seal head 20 disposed within the tubing 140 and (2) the intermediate seal head 22 includes a seal assembly 244 which is not included in the lower seal head 20. Preferably, the seal assembly 244 is identical to the seal assembly 34 of the upper seal head 18 and it is to permit the inclusion of such a seal assembly in the intermediate seal head 22 that the bore 142 of the intermediate seal head block 242 is provided with the enlarged portions 200 and 202 thereof. (Similar enlarged portions of the bore of the lower seal head block are provided only in order that the lower and intermediate seal head blocks can be built to one standard design.) As will be discussed below, during the operation of the seal head 10, it is necessary that the lower end of the bearing 244 fluidly communicate with the lower end 186 of the intermediate seal head block 242 and it is to provide such communication, despite the presence of the seal assembly 248 in the bore 142 of the intermediate seal head block 242 that the intermediate seal head block 242 is provided with the port 212 and passage 230 and, further, that the screw 218 is made of a length which will not interfere with the communication between the passage 230 and portions of the port 212 which intersect the bore 132 of the intermediate seal head block 242. (Similar features are provided in the lower seal head block 132 only for manufacturing standardization of the lower seal head blocks and intermediate seal head blocks as noted above.)

From the above described structure of the seal heads 18, 20 and 22 and the casing members 24, it will be clear that the seal section 10 can be provided with any number of annular compartments such as the annular compartments 26 in FIG. 1 by selecting the number of intermediate seal heads that are to be included in the assembled seal section 10. Specifically, a casing member 24 can be screwed onto the reduced diameter portion 184 of the outer periphery 136 of each of the selected number of intermediate seal heads 22, as shown in FIG. 7, followed by sliding the intermediate seal head 22 with attached casing member 24 along the shaft 16, casing member first, and screwing the casing member to the lower seal head block 130 or to an intermediate seal head block 242 already included in the seal section 10. The upper seal head block 18, with an attached casing member 24, as shown in FIG. 1, is similarly mounted on the shaft 16 after the selected number of intermediate seal heads 20 have been mounted thereon. (The length of the shaft 16 is selected to accommodate the selected number of intermediate seal heads 22.) It will also be clear from the above description that the casing members 24 can be provided with a length that will establish a selected relation between the spacing of the bearings 32, 198 and 244 along the shaft 16 and the diameter of the shaft 16. It has been found that such relation can be selected to eliminate excessive leakage of the seal assemblies and wear thereof, occasioned by whipping motion that the shaft 16 might undergo, between the bearings, as it is rotated by the motor. Specifically, it has been found that such affects can be made negligible by selecting the lengths of the casing members such that the minimum distance between nearest portions of bearings in successive seal heads does not exceed thirteen times the shaft diameter. In the preferred embodiment of the present invention, the casing member lengths are so selected to eliminate excessive leakage and wear to the seal assemblies in the practice of the present invention. Such selection can be advantageously utilized to insure a reasonable operating lifetime for a pumping unit incorporating the seal section 10 despite features of the present invention, to be specifically noted below, that provide the seal section 10 with a ready assembly capability even though the seal section 10 includes a selectable number of intermediate seal heads 22.

In the practice of the present invention, the seal section 10 is provided with a plurality of balance chambers by the mounting of the balance chamber forming assemblies within the annular compartments 26 (FIG. 1) as will now be explained with particular reference to FIGS. 2, 4, 5A and 7. As indicated especially in FIGS. 1 and 7, each balance chamber forming assembly 28 comprises a balance chamber outer wall member 250 which is connected to the lower end of the uppermost of each two seal heads delimiting each annular compartment. Thus, as shown in FIG. 1, a balance chamber outer wall member 250 is connected to the lower end 38 of the upper seal head block 30 of the upper seal head 18, such upper seal head 18 delimiting the upper end of the uppermost annular compartment 26 formed in the seal section 10. Similarly, a balance chamber outer wall member 250 is connected to the lower end 186 of each of the intermediate seal head blocks 242 which similarly delimit the upper ends of each of the remaining annular chambers 26 formed in the seal section 10. In particular, each balance chamber outer wall member 250 is sized to slip within the lowermost of the enlarged diameter portions of the bores of the seal head blocks at the lower ends thereof; that is, in the enlarged diameter portion 74 of the bore 58 of the upper seal head block 30 and in the enlarged diameter portion 204 of the bore 142 of the intermediate seal head blocks 242. (The portion 204 of the bore 142 is formed on the same diameter as the portion 74 of the bore 58 to permit interchangeability of balance chamber outer wall members 250 between the seal heads 18 and 22.) Welds, as at 252, (FIG. 2) and 254 (FIG. 7) secure the balance chamber outer wall members 250 to the seal heads 18, 22 so that each balance chamber outer wall member 250 extends downwardly toward the seal head below the seal head to which the balance chamber outer wall member 250 is attached.

Each balance chamber outer wall member 250 is provided with a preselected length such that the balance chamber outer wall members 250 each terminate in a free end 256 (see especially FIG. 7) which is disposed in a non-engaging relationship with the seal head that delimits the lower end of the annular compartment and such relationship has been specifically illustrated in FIG. 7 wherein a balance chamber outer wall member 250 connected to a seal head above the seal head shown in FIG. 7 has been drawn in phantom lines. As shown in FIG. 7, the free ends 256 of the balance chamber outer wall members 250 are positioned with respect to seal heads adjacent thereto such that no contact can be made between such free end 256 and such adjacent seal head at such times that the seal section 10 is assemblied. As will be clear from the discussion of the operation of the seal section 10 to follow, it is desirable that the downward extent of each balance chamber outer wall member 250 be maximized while the spacing between consecutive seal heads be limited. It is for this purpose that the grooves 210 are formed in the upper ends of each of the intermediate seal head blocks 242 and the lower seal head block 132; that is, so as to permit a greater downward extent of each of the balance chamber outer wall members 250 without bringing the free end 256 thereof into engagement with portions of seal heads delimiting the lower ends of the annular compartments 26.

Each balance chamber forming assembly 28 further comprises a balance chamber inner wall member 258 (FIGS. 5A and 7) which is of a smaller diameter than the balance chamber outer wall member 250 thereof. Each balance chamber inner wall member 258 is connected to the upper end of the lowermost of the two seal heads delimiting the ends of the annular compartment wherein the balance chamber inner wall member 258 is disposed and, for this purpose, the portions 208 of the bores 142 of the lower and intermediate seal head blocks, 132 and 242 respectively, are sized to receive the lower ends of the balance chamber inner wall members 258. The balance chamber inner wall members 258 can then be secured to the seal head blocks 132 and 242 by welds as at 260 (FIG. 5A) and 262 (FIG. 7). It will thus be noted that the interior of each balance chamber inner wall member 258 is in fluid communication with portions of the bore 142, wherein such member is mounted, above the bearing disposed in such bore 142 and that each balance chamber inner wall member 258 extends upwardly into one of the balance chamber outer wall members 250. As is the case with the balance chamber outer wall members 250, the balance chamber inner wall members 258 are provided with a preselected length such that each balance chamber inner wall member 258 terminates in a free end 264 which is disposed in a noncontacting relationship with the seal head that delimits the upper end of the annular compartment 26 wherein the balance chamber inner wall members 258 is disposed. Such relation has been particularly indicated in FIG. 4 wherein the balance chamber inner wall member 258 disposed in the uppermost annular compartment of the seal section 10 has been indicated in phantom lines.

As has been particularly shown in FIG. 7, to which attention is now invited, the connection of portions of each balance chamber forming assembly 28 to different seal heads forms each intermediate seal head 22 and the portions of the balance chamber forming assemblies 28 connected thereto into a balance chamber module comprising such intermediate seal head 22, a balance chamber inner wall member 258 extending from the upper end thereof and a balance chamber outer wall member 250 extending from the lower end thereof. As will be clear from the discussion of the assembly of the seal section 10 to follow, the formation of such modules facilitates the assembly of the seal section 10.

ASSEMBLY OF THE SEAL SECTION 10

Prior to the assembly of the seal section 10, the volume of fluid that will be displaced from the motor to be attached thereto each time the motor is started will generally be known and, moreover, the circumstances of the operation of the pumping unit will be known. Upon the basis of this knowledge, as will become clear from the description of the operation of the seal section 10 that follows, the number of intermediate seal heads 22 to be incorporated into the seal section 10 is selected and the length of the shaft 16 is then selected to be sufficient to pass through the seal section 10 as has been described above.

Initially, in the assembly of the seal section 10, the shaft 16 is mounted on the lower seal head 20 and the intermediate seal heads 22 can have casing members 24 screwed thereto in the manner shown in FIG. 7 and the upper seal head 18 can similarly have a casing member 24 screwed thereto as has been shown in FIG. 2. The seal section 10 is then assembled by mounting each of the intermediate seal heads 22 on the shaft 16, in turn, and moving such intermediate seal head 22 along the shaft until the casing member attached thereto engages the upper end of the lower seal head 20 or the upper end of an intermediate seal head 22 which has been incorporated into the seal section 10. The casing member 24 is then rotated to screw the lower end thereof to the seal head engaged by such lower end of such casing member 24. This process of adding additional seal heads and casing members to the growing seal section 10 is then continued until the upper seal head 18 and the casing member 24 attached thereto has been added to the the seal section 10.

This assembly of the seal section 10 is enabled, without extreme difficulty in aligning portions thereof, by the construction of the components of the seal section 10 as has been described above. In particular, the shaft 16 is rotationally supported in its passage through the annular chambers 26 of the seal section 10 solely by the bearings 32, 198 and 244 so that the addition of each seal head, 22 or 20, involves the alignment only of the connection of the bearing therein and the shaft 16 with the connection formed by the casing member attached to such seal head and the next lower seal head in the series thereof. Moreover, the termination of the balance chamber wall members, 250 and 258, in free ends which, in the assembled seal section 10, will not engage portions of the seal section 10; that is, the engagement of each balance chamber wall member solely with the seal head to which such well member is attached, prevents any interference with alignment of seal heads on the shaft 16 which would otherwise require the alignment of additional connections in the seal section 10. Thus, the above described construction of the components of the seal section 10 eliminates difficulties which have been encountered in the assembly of prior art seal sections which incorporate balance chambers.

OPERATION OF THE SEAL SECTION

Prior to inserting a pumping unit comprising the seal section 10, a motor attached to the lower end 138 thereof, and a pump attached to the upper end 12 thereof into a well, balance chambers, formed by the balance chamber forming assemblies 28 and the casings wherein such assemblies are disposed, are filled with oil having a density less than the density of fluids in the well wherein the pumping unit is to be used. It will be useful to briefly describe such filling, or charging, operation in order to bring out a fluid path by means of which the motor fluid communicates with the well in which the pumping unit is disposed during operation of the pumping unit. As a preliminary to filling the seal section 10, the cap screw 80 in port 76 of the upper seal head 18 (FIG. 2) and the cap screws 220 in ports 214 of the lower seal head 18 (FIGS. 5A and 6) and the intermediate seal heads 22 are removed. A suitable source of oil is then connected to an inlet port on the motor and oil is pumped into the motor and seal section 10 to follow a fluid path to the enlarged diameter portion 64 of the bore 58 in the upper seal head 18. Such portion of the bore 58 will be in fluid communication with the well, via the check valves 86 and 88, when the pumping unit is disposed in the well so that the fluid path to such portion provides a means of venting oil to the well so as to prevent a buildup of pressure in the motor and seal section when the motor is turned on to result in thermal expansion of oil in the motor and seal section 10.

As fluid is pumped into the motor, it will rise through the bore 144 of the motor mount 136 (FIG. 5B) and thence to the interior of the tubing 140 through the grooves 238 in the bearing 236. The slots 240 in the shaft 16 provide fluid communication between upper and lower portions of the interior of the tubing 140 so that the oil being introduced into the motor rises to the bore 142 of the lower seal head block 132 (FIG. 5A). As oil enters the bore 142, it will also enter the passage 232 and spill from the port 214 (FIG. 6) which has been provided to facilitate the escape of air from lower portions of the seal section 10. The port 214 is then closed via the cap screw 220 once such filling of lower portions of the seal section is complete.

Referring again to FIG. 5A, the oil thereafter rises in the bore 142, through the grooves 238 in the bearing 198 to the interior of the balance chamber inner wall member 258 attached to the lower seal head 20. The oil will then rise in the balance chamber inner wall member 258 to spill over the free end 264 thereof, to commence filling of the lowermost annular chamber 26 of the seal section 10. (The filling of such annular chamber can also be effected by pumping oil into the port 216 which, as noted above, communicates with the groove 210 formed in the upper end 134 of the lower seal head block 132.) As oil is introduced into the annular chamber above the lower seal head 20, air in lower portions of the bore 142 of the lowermost intermediate seal head will be discharged via the port 214 therein, such port being sealed via the cap screw 220 provided therefor when the lowermost annular chamber 26 is filled. Oil also rises in the annulus between the lowermost casing member 24 and the lowermost balance chamber outer wall member 250 to extend the fluid path from the motor to portions of the lower end 186 of the lowermost intermediate seal head block 242 which are intersected by the passage 230. As will be clear from FIG. 7, the oil will then rise through the passage 230 to enter the bore 142 of such lowermost intermediate seal head block 242, whence the oil passes through the groove 246 in the bearing 244 to the interior of the balance chamber inner wall member 258 attached to the lowermost intermediate seal head 22. Thereafter, the annular compartments 26 between the seal heads are successively filled by oil spilling over the free ends 264 of the balance chamber inner wall members 258 disposed in the compartments 26 until the uppermost annular compartment 26 has been filled. Subsequent introduction of oil into the motor or seal section 10 causes oil to enter the passages 98 and 100 (FIG. 4) to fill the upper portion 64 of the bore 58 through the upper seal head 18, thereby completing both the filling of the motor and seal section 10 with oil and the fluid path to the well. Subsequent to the filling of the motor and seal section 10 with oil, the pumping unit of which they are a part is lowered into the well.

When the pumping of the well is commenced, by turning on the motor attached to the lower end of seal section 10, oil in the motor will be heated and will expand to force the discharge of oil from the upper end of the seal section 10. Such expansion and discharge will continue until a condition of equilibrium is reached in which the expanded volume of oil is equal to the combined free, or oil filled, volumes of the motor and seal section 10.

Should the motor subsequently be turned off, that is, should the well be pumped on an intermittent basis, the oil in the motor will cool and consequently, contract so that its volume decreases. Accordingly, well fluids will enter the upper end of the seal section 10, via the pump or the check valve 88 in port 78 of the upper seal head block 30, to fill the volume of the seal section 10 that has been depleted of oil by the discharge of oil in the initial expansion and subsequent contraction thereof. The present invention contemplates that such volume will exceed the free volume of one of the annular compartments 26; that is, the portion of the volume thereof excluding the volume of the components of the balance chamber forming assembly 28 therein, so that well fluids will enter at least one of the annular compartments 26 below the uppermost of such compartments. Because of the relatively greater density of well fluids over the density of the oil used to fill the motor and seal section 10, the well fluids will sink to the lower end of the lowermost compartment 26 that such fluids enter and rise a distance in the annulus between the balance chamber inner and outer wall members 258 and 250 therein such that an oil-well fluid interface is formed therein in the usual manner of a balance chamber. In general, it can be expected that the contraction of the oil and the entry of well fluids into the seal section 10 will leave some oil in the annulus between the casing member 24 and the balance chamber outer wall member 250 in the lowermost annular compartment 26 that well fluids enter, such oil tending initially to collect in upper portions of such annulus and, over a period of time, to trickle along the above described fluid path to the next higher balance chamber formed by the balance chamber forming assembly 28 in the annular compartment 26 above the lowermost compartment 26 that well fluid enters. However, the volume of such oil will generally be small.

When the motor is subsequently restarted, the oil will again expand to again discharge fluid from the upper end of the seal section 10. However, during the subsequent expansion, the fluid so discharged, with the exception of the small amount of oil initially trapped in radially outermost portions of the lowermost balance chamber entered by well fluid, will be well fluid that has entered the seal section 10 during the previous contraction of oil therein. Thus, each time the motor is operated, subsequent to the initial operation thereof, only a small quantity of oil will be discharged from the seal section 10. Moreover, such amount is limited by the construction of the individual balance chambers and can be estimated. Accordingly, since the conditions under which the pumping unit will be operated will be known, the seal section 10 can be provided with a number of balance chambers to compensate for the loss of oil in each operating cycle during the expected operating lifetime of the pumping unit before replacement of seals therein becomes, as is the case with all such pumping units, necessary. Thus, the number of individual balance chambers incorporated into the seal section 10 will be selected such that the total free volumes thereof will exceed the combined volumes of oil discharged from the seal section 10 during the operating lifetime thereof. It will thus be seen that the above described construction of the seal section 10, which permits the stacking of balance chamber modules such as the modules shown in FIG. 7 and casing members 24 to form a plurality of balance chambers in the seal section 10, enables the totality of balance chambers so formed to act as an effective balance chamber having a large effective volume which can be readily varied to meet the requirements of the circumstances in which the pumping unit utilizing the seal section 10 will be used and the volume requirements of a balance chamber which are dictated by the size of the motor incorporated into the pumping unit.

It is clear that the present invention is well adapted to carry out the objects and obtain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A seal section for a downhole well pumping apparatus of the type having an oil filled motor drivingly connected to a pump via a shaft passing through the seal section, comprising:
   a plurality of vertically spaced seal heads between the motor and pump, each seal head having a bore formed therethrough for passage of the shaft therethrough and each seal head having bearing means rotationally supporting the shaft;
   a plurality of tubular casing members interconnecting the seal heads and forming therewith a plurality of vertically stacked, annular compartments centered on the shaft; and
   a plurality of balance chamber forming assemblies, each assembly disposed in one of the compartments and comprising:
      a tubular balance chamber outer wall member, connected solely to the uppermost of the two seal heads delimiting the compartment wherein the balance chamber outer wall member is disposed, each balance chamber outer wall member extending downwardly from such uppermost seal head in a concentric relation to the casing member thereabout to terminate in a free end positioned in a non-engaging relation with the lowermost seal head delimiting the compartment wherein the balance chamber outer wall member is disposed; and
      a tubular balance chamber inner wall member, connected solely to the lowermost of the two seal heads delimiting the compartment wherein the balance chamber inner wall member is disposed, each balance chamber inner wall member extending upwardly from such lowermost seal head inside the balance chamber outer wall member disposed therewith in such compartment and concentric with such balance chamber outer wall member to terminate in a free end positioned in non-engaging relation with the upper seal head delimiting the compartment wherein the balance chamber inner wall member is disposed;
   wherein the uppermost of the seal heads is characterized as having means fluidly communicating portions of the bore therethrough near the upper end thereof with the exterior of the balance chamber outer wall member in the annular compartment therebelow; wherein the lowermost of the seal heads is characterized as having means fluidly communicating the interior of the motor with the interior of the balance chamber inner wall member in the annular compartment thereabove; wherein remaining seal heads are characterized as having means fluidly communicating the interior of the balance chamber inner wall member in the compartment thereabove with the exterior of the balance chamber outer wall member in the compartment therebelow; wherein each seal head above the lowermost thereof is characterized as having seal means for providing a fluid seal between the shaft and the bore therethrough; and wherein the shaft is supported in the passage thereof through the seal section solely by the bearing means disposed in the seal heads.

2. The seal section of claim 1 wherein the balance chamber outer wall member in the uppermost compartment is welded to the uppermost of the seal heads; wherein the balance chamber inner wall member in the lowermost compartment is welded to the lowermost of the seal heads; and wherein remaining balance chamber inner and outer wall members and seal heads are organized in modules, each module comprising:
   one of such seal heads;
   one of said balance chamber inner wall members welded to the upper end of said one of such seal heads concentrically with the bore formed through said one of such seal heads; and
   one of said balance chamber outer wall members welded to the lower end of said one of such seal heads concentrically with the bore formed through said one of such seal heads.

3. The seal section of claim 1 or claim 2 wherein the lengths of the casing members and the disposition of the bearing means in the seal heads are selected such that the maximum distance between nearest portions of the bearing means in two consecutive seal heads is no greater than thirteen times the diameter of the shaft.

4. The seal section of claim 1 or claim 2 wherein an annular groove is formed in the upper end of each head below the uppermost of the seal heads, said grooves being formed concentrically with the bores formed through the seal heads; and wherein the free end of each balance chamber outer wall member is disposed in one of said annular grooves.

5. The seal section of claim 3 wherein an annular groove is formed in the upper end of each seal head below the uppermost of the seal heads, said grooves being formed concentrically with the bores formed through the seal heads; and wherein the free end of each balance chamber outer wall member is disposed in one of said annular grooves.

* * * * *